United States Patent [19]

Takahashi

[11] Patent Number: 5,519,649
[45] Date of Patent: May 21, 1996

[54] MICRO-PROCESSOR HAVING RAPID CONDITION COMPARISON FUNCTION

[75] Inventor: Yasuhiko Takahashi, Tokyo, Japan

[73] Assignee: Nippon Steel Corporation, Tokyo, Japan

[21] Appl. No.: 252,565

[22] Filed: Jun. 1, 1994

[30] Foreign Application Priority Data

Jun. 4, 1993 [JP] Japan .................... 5-160308

[51] Int. Cl.⁶ .................... G06F 7/00; G06F 7/38
[52] U.S. Cl. .................... 364/736.5; 364/736
[58] Field of Search .................... 364/736.5, 736

[56] References Cited

U.S. PATENT DOCUMENTS

| | | | |
|---|---|---|---|
| 4,821,225 | 4/1989 | Ando et al. | 364/736.5 |
| 5,260,898 | 11/1993 | Richardson | 364/736 |
| 5,276,891 | 1/1994 | Patel | 364/736.5 |
| 5,375,080 | 12/1994 | Davies | 364/736.5 |

*Primary Examiner*—Tan V. Mai
*Attorney, Agent, or Firm*—Pollock, Vande Sande & Priddy

[57] ABSTRACT

A micro-processor includes an arithmetic logic unit (ALU) for executing a computer program stored in memory. The micro-processor further includes a condition comparison memory unit, such as a content addressable memory for example, which is connected to the ALU via a data bus. The condition comparison memory unit stores a) comparison patterns for a plurality of comparison operations, and b) output values which correspond to the comparison patterns. Upon receiving an operand of a comparison operation from the ALU, the condition comparison memory unit generates an output value corresponding to the comparison pattern which is coincident with the operand. The generated output value represents a memory address from which the computer program is subsequently executed. The micro-processor also includes an execution control unit which controls the ALU and the condition comparison memory unit.

6 Claims, 3 Drawing Sheets

1

MICRO-PROCESSOR HAVING RAPID CONDITION COMPARISON FUNCTION

BACKGROUND OF THE INVENTION

1. Field of the Invention

The present invention relates to a microprocessor.

2. Description of the Related Art

In a micro-processor, flow controls such as IF, JUMP, GO TO, and so on are performed with reference to external input signals, states of flags or the like in an arithmetic logic unit (ALU).

FIG. 1 is a diagram illustrating the basic structure of a micro-processor unit (MPU) of a conventional micro-programming type, only showing constituents particularly related to the invention.

In FIG. 1, address data indicated by a program counter 22 in a sequencer 21 of an execution control unit 20 is outputted as an operation instruction to an ALU 24 by a micro-program 23. From the micro-program 23, in addition to this operation instruction, data to be operated is delivered to a bus 25 and a predetermined control signal is outputted to the outside of the micro processor.

An operation result of the ALU 24 is inputted to the sequencer 21 or delivered to the bus 25 in order to utilize it. The sequencer 21 is also provided with flag information indicative of an operating state of the ALU or the like, information from the outside, and flow control information from the micro-program 23, in addition to the operation result. With this information, the execution of the sequencer 21 is controlled.

The flow control of the micro-program 23 is performed by changing an instruction execution destination in accordance with the contents and type of an external interrupt signal, and a flag associated with the operation result of the ALU 24. Particularly, the flow control, when performed on the basis of data, is carried out in accordance with the operation result of the ALU 24.

However, since a conventional micro-processor can only compare one pattern at a time with respect to the operation result of the ALU 24, many comparisons would be very time consuming.

Also, a method using a multiple branch may be thought of as a flow control method. However, with comparison of 32-bit data, for example, more than 4 billion of flow controls are theoretically possible so that an address space for them must be reserved, which is not practical.

Particularly, in a micro-processor which is required to have the real time performance, a condition comparison cannot be performed with data of a large bit width.

SUMMARY OF THE INVENTION

Therefore, it is an object of the present invention to enable a micro-processor to execute the condition comparison with data of a wide bit width in a short time period.

To achieve the above object, according to the present invention, a microprocessor is provided which comprises an arithmetic logic unit (ALU); a condition comparison memory unit connected to a data bus of the ALU, for storing comparison patterns for a plurality of comparison operations and output values corresponding to the comparison patterns, and for receiving an operation result from the ALU to output the output value corresponding to the comparison pattern coincident with the operation result; and an execution control unit connected to the ALU and the condition comparison memory unit for controlling the ALU and the condition comparison memory unit.

In the above-mentioned micro-processor, the condition comparison memory unit outputs a value representative of a branched address based on an operation result of the ALU, so that the ALU processes an execution instruction at the branched address, whereby a rapid condition comparison is made possible with data having a large bit width, and flexible flow control can be performed.

The condition comparison memory unit may include a content addressable memory or a programmable logic array.

Further, the condition comparison memory unit may include a condition number field for storing condition numbers for the plurality of comparison operations and a comparison pattern field for storing the comparison patterns for the plurality of comparison operations, and for receiving an operation result and a condition number for a comparison operation from the ALU to output the value corresponding to the comparison pattern coincident with the operation result when the received condition number coincides with the stored condition number.

Also, the condition comparison memory unit may further output flag data indicative of a comparison together with the output value corresponding to the comparison pattern coincident with the operation result from the ALU.

DESCRIPTION OF THE PREFERRED EMBODIMENTS

A first embodiment of the present invention will hereinafter be described with reference to FIG. 2.

Figure 2:
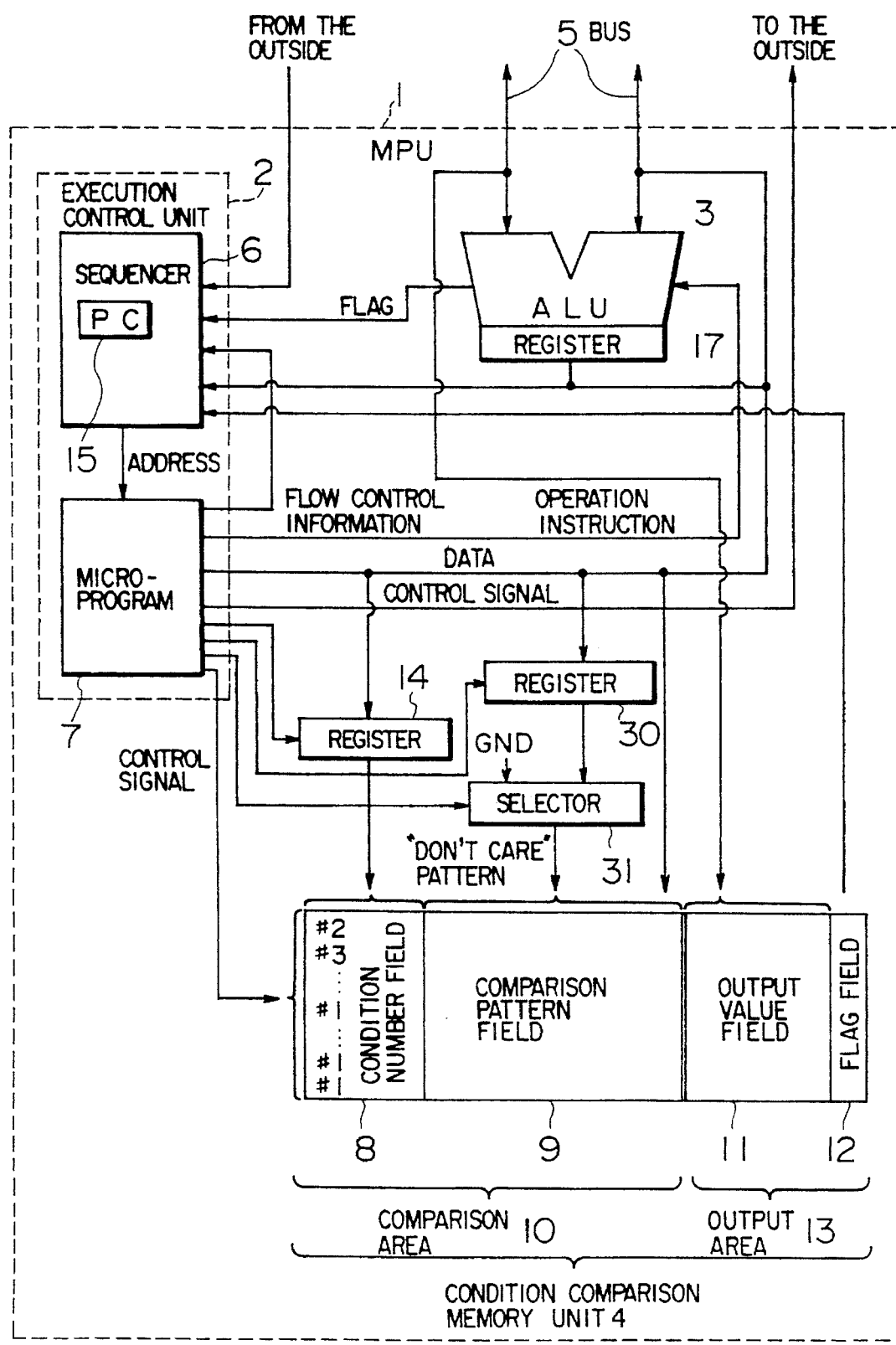
FIG. 2 is a diagram showing the configuration of a micro-processor according to a first embodiment of the present invention.

In FIG. 2, reference numeral 1 designates a microprocessor (MPU); 2 an execution control unit; 3 an arithmetic and logic unit (ALU); and 17 a register. Also, reference numeral 4 designates a content addressable memory (CAM), which is a condition comparison memory unit, connected to a bus line 5, a sequencer 6, and a micro-program 7. Here, while the CAM is used as an example of a condition comparison memory unit, a programable logic array or the like may also be used, as well as other associative memories.

The condition comparison memory unit 4 comprises a comparison area 10 including a condition number field 8 and a comparison pattern field 9; and an output area 13 including an output value field 11 and a flag field 12. Then, in a register 14 corresponding to the condition number field 8, data from the bus 5 is stored by a control signal inputted from the micro-program 7. The data is thereafter outputted to the condition number field 8. The control signal from the micro-program 7 is also provided to the condition comparison memory unit 4. In the condition comparison memory unit 4, the comparison pattern field 9 is connected to a data bus from the ALU, while the output value field 11 is connected to the bus 5. Also, flag data in the flag field 12 indicative of a data comparison in the comparison area 10 is supplied to the sequencer 6 through a signal line.

Next, the operation of the micro-processor configured as described above will be explained.

If a plurality of pairs of tags, i.e., data for comparison, have previously been stored in the CAM used as the condition comparison memory unit 4, when a tag is inputted from the outside, data corresponding to a tag for comparison coincident with the inputted tag is outputted. In this embodiment, a plurality of condition numbers and comparison patterns for comparison operation are stored in the CAM as tags, while the output values of their comparison operations and flag data are stored as output data. Incidentally, since the condition numbers are used in grouping, later described, the operation is possible even without the condition number field 8. The consents of the comparison pattern indicates a condition for executing an instruction having a branched address.

When a program to be executed includes a condition comparison instruction, its contents are executed by the micro-program 7. Then, during the execution of the micro-program 7, and under its control portions of data of an operation result by the ALU 3 corresponding to a condition and a branch destination of this condition comparison instruction are inputted to the condition comparison memory unit 4 from the bus 5 or from the ALU 3 through the register 17, and compared with comparison patterns.

Then, by a control signal provided from the micro-program 7 to the condition comparison memory unit 4, the data of the operation result derived through the bus 5 or from the ALU 3 through the register 17 is compared with comparison patterns stored in the comparison pattern field 9.

If a coincident pattern is found as a result of the comparison, the output value and flag data corresponding to the coincident pattern are outputted to the bus 5 and the sequencer 6 or to either of them. Then, an instruction to execute at the branched address is processed by the ALU 3 based on this output value through the bus 5.

As explained above, by utilizing the CAM or the like as the condition comparison memory unit to execute a comparison of data of the operation results with comparison patterns, a condition comparison is performed in accordance with an inputted comparison pattern to enable an execution location to be changed to a designated address. Thus, a comparison of data having a larger bit width than before can be performed in a short time period, thereby making it possible to perform flow control which requires a real time operation.

Also, since the contents of the CAM as the condition comparison memory unit or the like may be arbitrarily changed, the installed system may be modified by changing the comparison pattern. In this manner, the present invention has an advantage in that an application area is wider. Also, utilization in a field programmable gate array or the like is efficient.

Further, with the aforementioned condition numbers, data to be compared may be classified into several groups each having the same condition number. When data to be compared in the same condition increases, a new execution location of a program can be easily changed by using this grouping to compare the data.

An example of the grouping will be next explained. For such a case when a module C is instructed to execute when an operation result x1 is derived during the execution of a module A in a program, while another module D is instructed to execute when an operation result x2 is derived; and a module E is instructed to execute when the operation result x1 is derived during the execution of a module B, while a module F is executed when the operation result x2 is derived, the distinction of the modules as well as the comparison patterns is required.

For this reason, the portions of data of the operation results by the ALU 3 is classified in the register 14 into a group #1 including the comparison patterns x1, x2 during the execution of the module A and a group #2 including the comparison patterns x1, x2 during the execution of the module B, and the group numbers are stored in the condition number field 8 as condition numbers.

Then, with a step of designating the group #1 in the register 14 during the execution of the module A and a step of comparing data of the operation result with comparison patterns, when a module under execution coincides with a condition number stored in the condition number field 8 and when the operation result coincides with a comparison pattern stored in the comparison pattern field 9, an output value and flag data corresponding to them may be outputted, whereby the grouping can be achieved.

Also, as shown in FIG. 2, a register 30 and a selector 31 may be provided so as to set a mask, in other words, "Don't Care" in comparison pattern bits.

First, a mask pattern is inputted to the register 30 by a micro-program under the control of the micro-program. For example, bits "1" in 24 bits are replaced with "Don't Care".

Next, the control from the micro-program makes the selector 31 select the register 30 or a line connected to the ground. If the line connected to the ground is selected, all values are set to zero, whereby no "Don't Care" is found in the comparison pattern. If the register 30 is selected, a comparison is performed with a pattern including "Don't Care". Since the CAM generally has this mask function, this is utilized.

A second embodiment will next be described with reference to FIG. 3.

Figure 1:
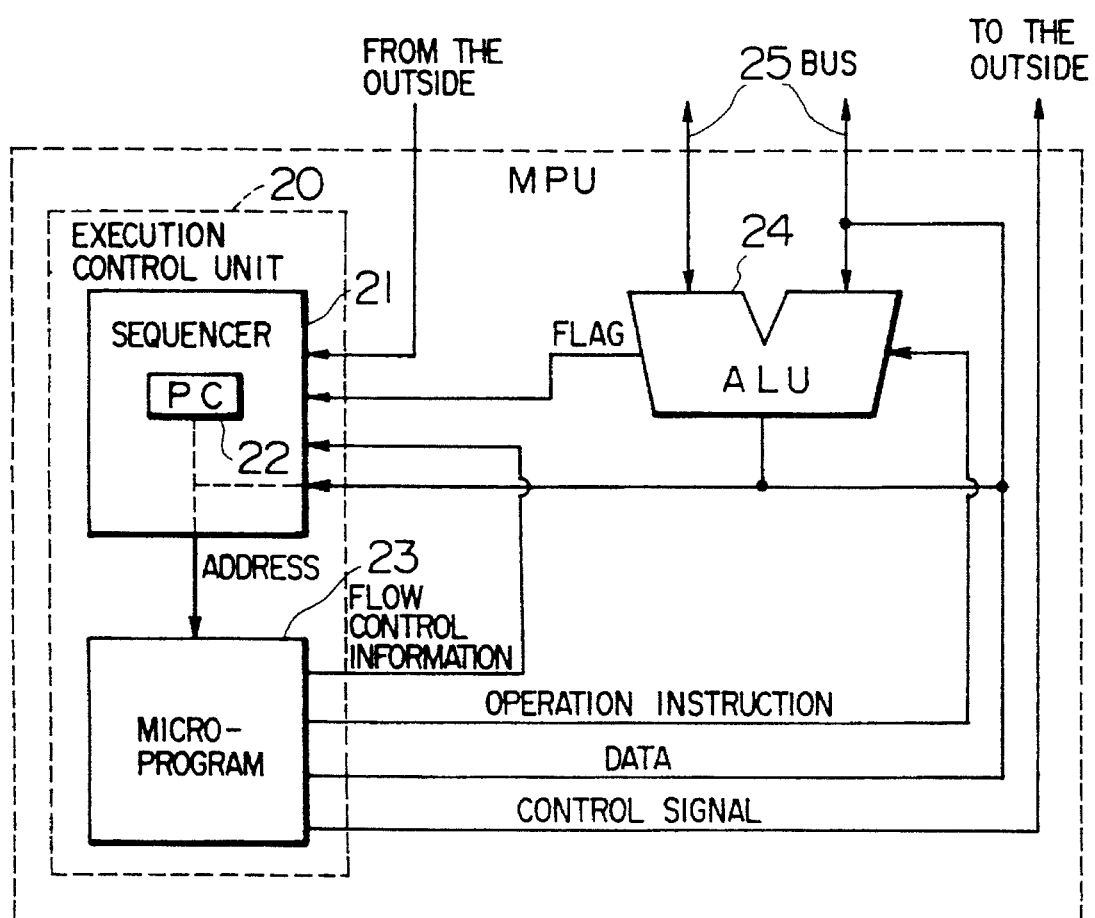
FIG. 1 is a diagram showing the configuration of a conventional micro-processor of micro-program type.
Figure 3:
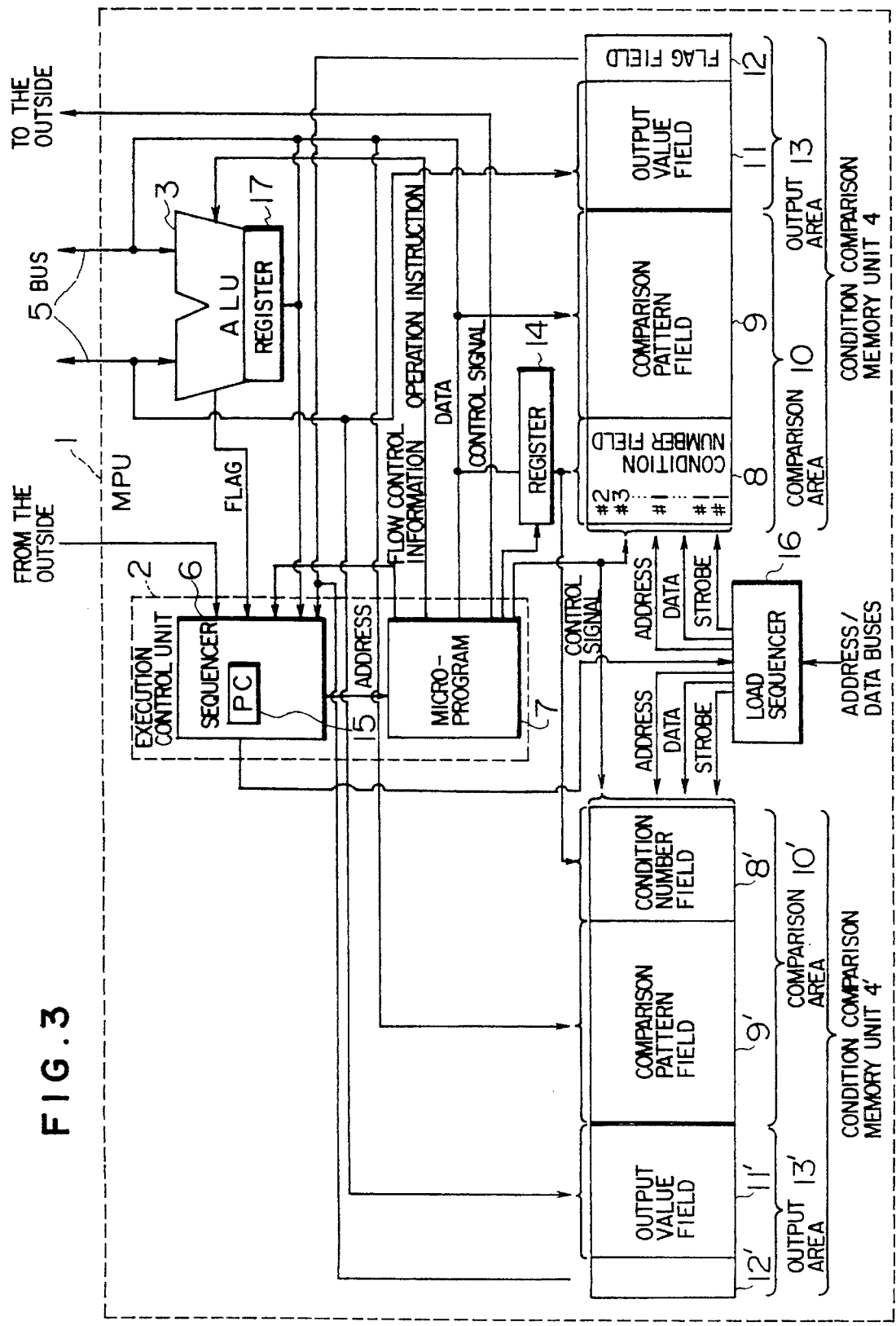
FIG. 3 is a diagram showing the configuration of a micro-processor according to a second embodiment of the present invention.

In FIG. 3, parts identical to those in FIG. 1 are designated with the same reference numerals. The difference with FIG. 1 lies in that a further condition comparison memory unit 4' and a load sequencer 16 are added.

The condition comparison memory unit 4' comprises, similarly to the condition comparison memory unit 4, a comparison area 10' including a condition number field 8' and a comparison pattern field 9'; and an output area 13' including an output value field 11' and a flag field 12'.

The load sequencer 16 performs the control for storing into either of the condition comparison memory units 4 and 4' data inputted from an external storage unit, for example, a hard disk drive through an interface.

Stored in the external storage unit are comparison data required for a program to be executed in a plurality of divisions. For example, the data is stored in such a manner that it is divided into comparison data a required by the execution of a program A; comparison data b required by the execution of a program B; comparison data c required by the execution of a program C; and so on.

In this manner, when there is a large number of comparison data, comparison data to be used can be previously prepared for a program to be executed.

Next, the operation of this embodiment will be explained.

Since which comparison pattern is required in which part of a program to be executed is previously known, a necessary value of a program counter is stored in the load sequencer.

The value of a program counter in the sequencer 6 is inputted to the load sequencer 16. In the load sequencer 16, it is determined whether or not this value is the stored predetermined value. If it is the predetermined value, comparison data to be stored in the condition comparison memory unit 4 or 4' is read from an external RAM through the address and data buses.

For example, when the comparison data a used by part of the program A currently under execution is stored in the condition comparison memory unit 4, the comparison data b used by the program B to be executed after the value of the program counter becomes the predetermined value is stored in advance into the condition comparison memory unit 4'.

Then, after the load sequencer 16 has stored the data b into the condition comparison memory unit 4', the program B using the data b is executed, wherein the flow control is performed with the contents of the condition comparison memory unit 4'.

Similarly, when the load sequencer 16 detects that the value of the program counter presents the next predetermined value, the comparison data c used by the program C, which is to be subsequently executed, is stored in advance into the condition comparison memory unit 4.

The load sequencer 16 designates an address in the external storage unit in which necessary comparison data is stored, receives the data and inputs the data to the condition comparison memory unit. Then, an address is designated by the load sequencer 16 to the condition comparison memory unit 4 or 4', and the load sequencer 16 outputs data at that address onto the data line and outputs the comparison data from the external storage unit to the condition comparison memory unit 4 or 4' at the timing of a write strobe signal.

While in the foregoing example, the operation of the load sequencer is determined by the value of the program counter, a unique instruction for loading a comparison pattern from the external RAM to the load sequencer may be written in an application program.

Also, while the comparison data is read from the external RAM, dual port memories may be provided such that the comparison patterns are written thereinto from an external memory and read therefrom, if a data bus form is not employed.

Incidentally, the register 30 and the selector 31 may be provided also in this embodiment similarly to the first embodiment.

According to the present invention as described above, a micro-processor is enabled to execute a condition comparison with data having a large bit width in a short time period, thereby making it possible to flexibly handle flow control which requires a real time operation.

I claim:

1. A micro-processor comprising:

an arithmetic logic unit (ALU) for executing a computer program which is stored in memory;

a condition comparison memory unit connected to said ALU via a data bus for storing a plurality of a) comparison patterns for a plurality of comparison operations and b) output values, each comparison pattern corresponding to one output value, said condition comparison memory unit receiving an operand for a comparison operation from said ALU and generating an output value corresponding to said comparison pattern which is coincident with said operand, wherein said output value represents a memory address from which said computer program is subsequently executed; and an execution control unit connected to said ALU and said condition comparison memory unit for controlling thereof.

2. A micro-processor according to claim 1, wherein said execution control unit comprises a sequencer.

3. A micro-processor according to claim 1, wherein said condition comparison memory unit comprises a content addressable memory.

4. A micro-processor according to claim 1, wherein said condition comparison memory unit comprises a) a condition number field for storing condition numbers for said plurality of comparison operations and b) a comparison pattern field for storing said comparison patterns for said plurality of comparison operations, said condition comparison memory unit receiving an operand and a condition number for a comparison operation from said ALU and generating an output value corresponding to said comparison pattern coincident with said operand when said received condition number coincides with a stored condition number.

5. A micro-processor according to claim 1, where said condition comparison memory unit further comprises a flag field to output data indicative of a comparison situation when said output value corresponding to said comparison pattern is coincident with said operand.

6. A micro-processor according to claim 1, wherein said condition comparison memory unit comprises a programmable logic array.

* * * * *